United States Patent
Stirling-Gallacher (10) Patent No.: US 8,593,540 B2
(45) Date of Patent: Nov. 26, 2013

(54) ACTIVE IMAGING DEVICE AND METHOD FOR SPECKLE NOISE REDUCTION INCLUDING FREQUENCY SELECTION

(75) Inventor: Richard Stirling-Gallacher, Stuttgart (DE)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 13/087,813

(22) Filed: Apr. 15, 2011

(65) Prior Publication Data
US 2011/0273585 A1 Nov. 10, 2011

(30) Foreign Application Priority Data
May 4, 2010 (EP) .................................. 10161881

(51) Int. Cl.
*H04N 9/73* (2006.01)
(52) U.S. Cl.
USPC ........................................ 348/227.1; 348/241
(58) Field of Classification Search
None
See application file for complete search history.

(56) References Cited

U.S. PATENT DOCUMENTS

| 6,184,981 | B1 | 2/2001 | Hasson et al. | |
|---|---|---|---|---|
| 6,777,684 | B1 | 8/2004 | Volkov et al. | |
| 6,827,685 | B2 | 12/2004 | Lin et al. | |
| 2003/0179388 | A1 | 9/2003 | Peters et al. | 358/1.1 |
| 2003/0184467 | A1* | 10/2003 | Collins | 342/22 |
| 2003/0190090 | A1* | 10/2003 | Beeman et al. | 382/284 |
| 2004/0258325 | A1* | 12/2004 | Sasada | 382/275 |
| 2005/0064922 | A1* | 3/2005 | Owens et al. | 455/575.5 |
| 2005/0203395 | A1 | 9/2005 | Sui et al. | |
| 2007/0139248 | A1 | 6/2007 | Baharav et al. | |
| 2008/0158169 | A1* | 7/2008 | O'Connor et al. | 345/173 |
| 2009/0076394 | A1* | 3/2009 | Wong et al. | 600/459 |
| 2009/0209858 | A1 | 8/2009 | Oelze | |
| 2010/0004540 | A1 | 1/2010 | Thiele | |
| 2010/0220903 | A1* | 9/2010 | May et al. | 382/128 |
| 2011/0255786 | A1* | 10/2011 | Hunter | 382/190 |
| 2012/0019690 | A1* | 1/2012 | Stirling-Gallacher | 348/241 |

OTHER PUBLICATIONS

U.S. Appl. No. 13/185,061, filed Jul. 18, 2011, Stirling-Gallacher.
Extended European Search Report issued Jun. 29, 2012 in patent application No. 11161164.6.
A. Lorenz et al., "A Gaussian Model Approach for the Prediction of Speckle Reduction with Spatial and Frequency Compounding," http://www.lp-it/papers/lorenz961.PDF, IEEE, Ultrasonic Symposium, 1996, 5 pages.
Irina Jaeger et al., "Comparison of speckle reduction diversity tools for active millimeter-wave imaging," J. Optical Society of America, vol. 25, No. 7, Jul. 2008, pp. 1716-1721.
Zengguo Sun et al., "Research and Improving on Speckle MMSE Filter Based on Adaptive Windowing and Structure Detection," IEEE, 2005, pp. 251-256.

* cited by examiner

*Primary Examiner* — Nicholas Giles
*Assistant Examiner* — Abdelaaziz Tissire
(74) *Attorney, Agent, or Firm* — Oblon, Spivak, McClelland, Maier & Neustadt, L.L.P.

(57) ABSTRACT

An active imaging device for imaging a scene includes a scene illuminator that illuminates the scene, a radiation detector that detects radiation received from the scene, a feature identifier that analyses the detection data and identifies different features in the scene, a frequency selector that separately selects for the identified features one or more selected illumination frequencies resulting in the minimum speckle noise in an image of the respective feature constructed from the detection data.

16 Claims, 6 Drawing Sheets

ACTIVE IMAGING DEVICE AND METHOD FOR SPECKLE NOISE REDUCTION INCLUDING FREQUENCY SELECTION

CROSS-REFERENCE TO RELATED APPLICATIONS

The present application claims priority of European patent application 10 161 881.7 filed on May 4, 2010.

FIELD OF THE INVENTION

The present invention relates to an active imaging device and a corresponding method for imaging a scene. The present invention relates further to an image processing device and method for use in an active imaging device and method. Still further, the present invention relates to a computer readable non-transitory medium storing a computer program. The present invention particularly directed to the reduction of speckle noise.

BACKGROUND OF THE INVENTION

Speckle noise (also called "speckle" in the following) is a granular noise that inherently exists in and degrades the quality of images obtained by active imaging devices, such as active radars, and synthetic aperture radars (SARs). Speckle noise in conventional radar results from random fluctuations in the return signal from an object that is no bigger than a single image-processing element. It increases the mean grey level of a local area.

Various techniques have been proposed to reduce the effect of speckle for illumination systems such as laser projectors, but these techniques concentrate on removing the phase coherence of the transmitted signal, which help to decrease the speckle on the final image. Such techniques however cannot be used for an active imaging device, since it is important that the transmitted signal in an active imaging device maintains its phase coherence.

The use of multiple frequency techniques to reduce the effects of speckle in an active imaging device has been proposed in I. Jaeger et al, "Comparison of speckle reduction diversity tools for active millimeter-wave imaging", Journal of the Optical Society of America, Vol. 25, No. 7, July 2008. This paper describes (in section 3) the use of more than one frequency to reduce the effects of speckle. In particular, it explains that when an object is illuminated with two frequencies, the amount of speckle noise can be reduced as the difference between these frequencies is increased. It also further indicates that to obtain a desired speckle reduction for a given object, the difference frequency between these two frequencies may have to be adaptively changed, in accordance with the optical properties of the object, which undesirably may need a large bandwidth.

The use of the properties of different image feature/structures for selecting how to best filter the final image to reduce the effects of speckle in an active imaging device is described in Zengguo et al, "Research and Improving on Speckle MMSE Filter Based on Adaptive Windowing and Structure Detection", IEEE International Conference on Vehicular Electronics and Safety 2005, pp. 251-256. This paper describes a technique to reduce speckle for an image in which different image features are first classified into heterogeneous or homogenous areas. Features in the heterogeneous areas are then further identified and for each type of feature (line, edge, point) different types of filtering are used to reduce the speckle noise.

BRIEF SUMMARY OF THE INVENTION

It is an object of the present invention to provide an active imaging device and method, by which speckle noise occurring during active imaging can be effectively reduced with small efforts. It is a further object of the present invention to provide a corresponding image processing device and method as well as a corresponding computer program for implementing said image processing method and a computer readable medium.

According to an aspect of the present invention there is provided an active imaging device for imaging a scene, comprising:
a scene illuminator that illuminates said scene with radiation at multiple illumination frequencies or an illumination frequency range covering multiple illumination frequencies,
a radiation detector that detects radiation received from said scene in response to said illumination and that generates detection data from said detected radiation,
a feature identifier that analyses said detection data and identifies different features in said scene,
a frequency selector that separately selects for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
an image constructor that constructs a final image from the detection data, wherein the image portions of the identified features are constructed from the detection data, which have been generated from radiation received in response to the illumination of the scene with radiation at said one or more selected illumination frequencies, and wherein said image portions are combined into the final image.

According to a further aspect of the present invention there is provided an image processing device for use in an active imaging device as defined above and as proposed according to an aspect of the present invention, said image processing device comprising corresponding radiation detector, frequency selector and image constructor.

According to a still further aspect a computer readable non-transitory medium having instructions stored thereon which, when carried out on a computer, cause the computer to perform the steps of the method according to the present invention is provided.

Preferred embodiments of the invention are defined in the dependent claims. It shall be understood that all the claimed devices and methods, the claimed computer program and the claimed computer readable medium have similar and/or identical preferred embodiments as the claimed active imaging device and as defined in the dependent claims.

The inventors of the present invention have found that the known speckle reduction noise technique using multiple frequencies shows disadvantages. In particular, just summing (or averaging) the received images from the different illumination frequencies, without any intelligent selection, can cause the speckle, for certain image features, to be worse than the sum of some of the received images from the individual frequencies. This is because the resulting speckle for a given feature is a function of the illumination wavelength (or frequency) and the roughness for each feature.

Further, if the multiple frequency techniques described in the above cited paper of I. Jaeger is used, the frequency spacing between illuminated frequencies would have to be dynamically changed, depending upon the properties of the material. It is particularly proposed this paper that optical properties of the object could be measured to do this. Such a scheme would have the following drawbacks:

a) It requires that the object is optically (or otherwise) visible, so that, the physical properties can be measured.
b) Feedback would have to be provided to the transmitter (or illumination menas) for each feature, which includes information about the physical properties of each feature.
c) The transmitter would have to be capable of dynamically changing its transmitter frequencies in accordance with the feedback information.
d) If it is required that each feature of the image has minimum speckle, steps a)-c) would have to be done in series for each feature. This would be very time consuming.

Hence, it is proposed according to an aspect of the present invention to illuminate the scene (including an object to be imaged, e.g. a person) by a number of different frequencies (which may or may not be sent at the same time), which are fixed by the capabilities of the transmitter (or illumination means) and that the whole scene (or area to be scanned) is illuminated by these frequencies. At the receiver (or radiation detection means and its connected elements) different features in the image are then identified, and for some or all identified features (and, preferably, also the background, which is also treated like a feature), the illumination frequencies, which yield the lowest level of speckle noise, are selected. These selected frequencies are then combined to yield the final image feature. The final image comprises these final image features, which may have resulted from the combination of different illumination frequencies.

For a transmitter with a given set of illuminated frequencies, the best selected combination of these illuminated frequencies at the receiver (to reduce speckle) is thus found and combined for each image feature. The selection of combinations for each feature can be done in parallel at the receiver and therefore the object can be scanned very quickly.

Further, according to the present invention the transmitter does not have to dynamically change its set of transmitter frequencies and it does not require any feedback information from the receiver, as is required according to the multiple frequency technique described in the above cited paper of I. Jaeger. Still further, unlike this technique according to the present invention no extra information of the object (or item) is required.

The present invention is also different to the concept described in the above cited paper of Zengguo, since generally no filtering techniques are used according to the present invention. Different image features are identified, but the speckle reduction is achieved by adaptively selecting and combining the received frequencies, which have the lowest amount of speckle for each feature.

According to still a further aspect of the present invention there is provided an active imaging device for imaging a scene, comprising:

an illumination means for illuminating said scene with radiation at multiple illumination frequencies or an illumination frequency range covering multiple illumination frequencies,
a radiation detection means for detecting radiation received from said scene in response to said illumination and for generating detection data from said detected radiation,
a feature identification means for analysing said detection data and identifying different features in said scene,
a frequency selection means for separately selecting for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
an image construction means for constructing a final image from the detection data, wherein the image portions of the identified features are constructed from the detection data, which have been generated from radiation received in response to the illumination of the scene with radiation at said one or more selected illumination frequencies, and wherein said image portions are combined into the final image.

According to a further aspect of the present invention there is provided an image processing device for use in an active imaging device as defined above and as proposed according to an aspect of the present invention, said image processing device comprising corresponding radiation detection means, frequency selection means and image construction means.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Active imaging systems are becoming increasingly more popular at ultrasonic, microwave, millimeter and terahertz frequencies for a number of applications including medical and security applications.

The arrangement of transmitter and receiver in an active imaging system may take on many different forms, but in the most general sense active systems use a transmitter (generally an "illumination means") to illuminate the object (or item, in general the "scene") to be studied by transmitting at the frequency (or frequencies) of interest and analyse the received signal due to reflections and/or transmission characteristics of the object. The present invention is primarily directed to active imaging using the reflected signal, although the idea may also be used in active imaging using the transmitted signal.

Figure 1A:
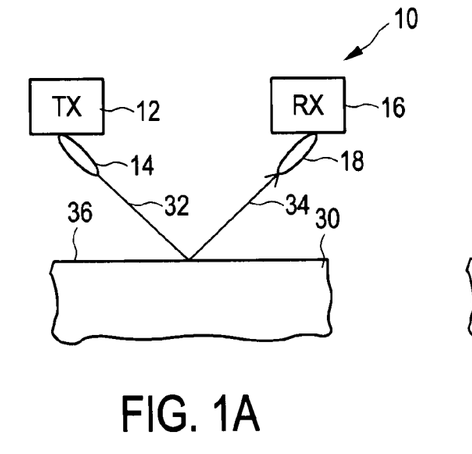
FIG. 1 shows a first embodiment of an active imaging device.
Figure 1B:
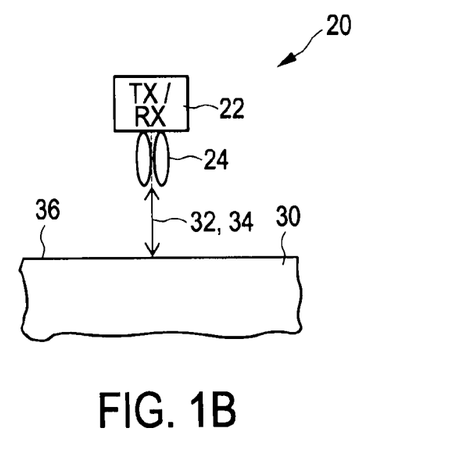

The general layout of simple arrangements of an active imaging device is schematically depicted in FIGS. 1A and 1B. FIG. 1A shows a bi-static arrangement 10 in which the transmitter 12 (labelled as TX), including a transmit antenna 14, and the receiver 16 (labelled as RX), including a receive antenna 18, are not collocated. FIG. 1B shows a mono-static arrangement 20, in which both the transmitter and the receiver 22, including one or more (separate or shared) antenna(s) 24, are collocated. In these simple general arrangements 10, 20 beam antennas 14, 18, 24 for both transmitter and receiver are shown, which may be implemented in many different ways.

The object 30 (generally, the scene, which usually includes the object, e.g. a person or item) is illuminated by radiation 32, and the reflected radiation 34 is detected, from which detected radiation a radiation signal is generated for further processing. In these simple arrangements 10, 20 it is generally assumed that the transmitted wave of the radiation 32 is hitting a flat surface 36 of the object and that no significant amount of transmitted energy penetrates into the object 30 (or item). The active imaging device could be using any type of transmission scheme (i.e. pulse based, multi-carrier, frequency modulated continuous wave (FMCW), etc.) and could be using any frequency.

This case of not penetrating the object or item's surface would typically be similar to an aircraft fuselage being detected by air traffic control radar or an active imaging security body scanner where the transmitted wave does not penetrate the human skin.

Figure 2A:
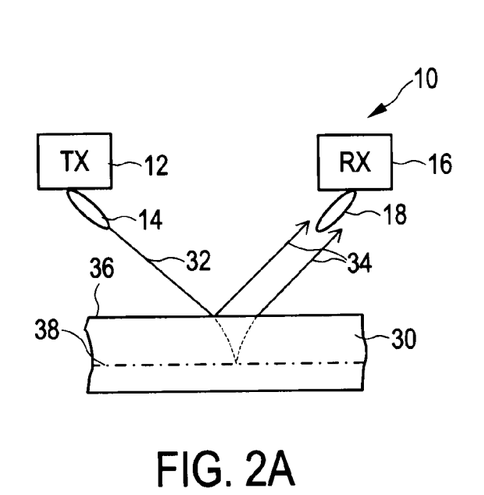
FIG. 2 shows a first embodiment of an active imaging device.
Figure 2B:
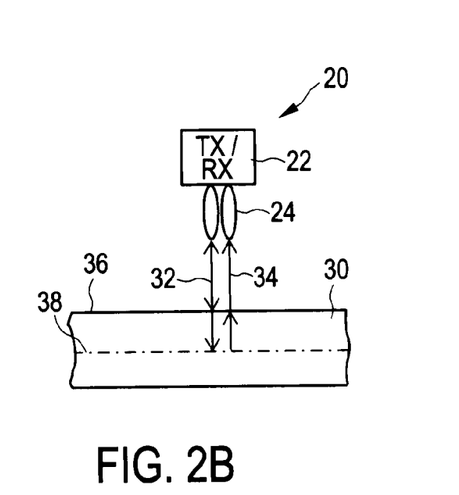

The arrangements 10, 20 of the imaging device used for imaging an object 30 (or item) having multiple reflecting layers 36, 38 are shown in FIGS. 2A and 2B. Here, both arrangements 10, 20 are generally bi-static. Typical example of this multi-layer case would be in medical diagnosis when ultrasound (<10 MHz) or Ultra-wideband (typically 3-10 GHz) frequencies are used.

Figure 3:
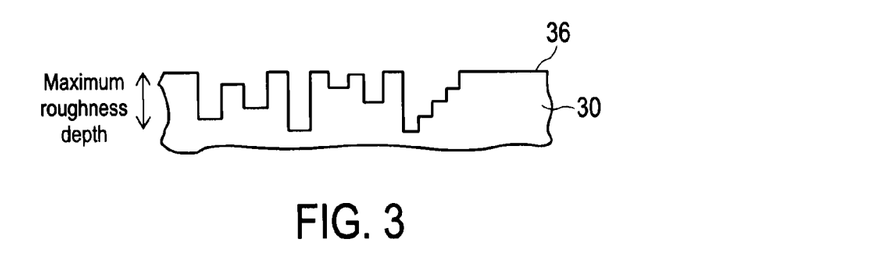
FIG. 3 shows a diagram illustrating a rough surface of an object.

For all of these systems, where the reflected signal is analysed at the receiver, the received signal (and resulting final image) may be degraded by a multiplicative noise known as speckle noise. Speckle noise is generated by the summing of multiple reflections (which have different phase shifts) and occurs when the object has a rough reflecting surface or layer. A simple model of roughness is shown in FIG. 3. Such a roughness could occur at the surface 36 of the object 30 or could occur at one of the intermediate layers 38 of the object 30 as shown in FIG. 2.

Figure 4A:
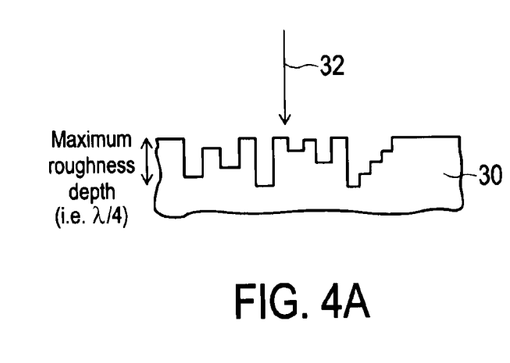
FIG. 4 shows a diagram illustrating the generation of speckle noise on a rough surface.
Figure 4B:
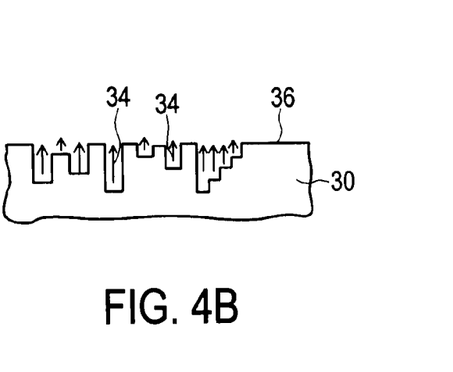

The reason, why the speckle noise occurs, is illustrated with reference to FIG. 4. In FIG. 4A it is assumed that the transmitted signal 32 is hitting the object surface 36 (or immediate layer) at 90°. FIG. 4B shows the reflected signal 34. Since the surface 36 (or immediate layer) is rough, the total reflected signal 34 is the summation of all the different reflections which can be received by the receiver antenna. Since many of the individual reflected signals 34 had to travel different distances (due to the roughness), they all have different phase shifts and the total power of reflected signal can be reduced.

If some reflected signals have to travel half a wavelength ($\lambda/2$) longer than other reflected signals, the difference in phase can be 180° and the reflections can totally cancel each other out. In FIG. 4 the example maximum roughness is ($\lambda/4$) and the signals being reflected back from the lowest part in the roughness do indeed have to travel ($\lambda/2$) longer than waves which are being reflected back from the top of the surface 36.

As an object is scanned therefore (e.g. by moving the Tx and Rx beam antenna directions, or by moving the transmitter and receiver units, or by electronically sweeping the antenna beams or radiation patterns), there can be a huge variation in the received signal depending upon the roughness of the surfaces being illuminated, the roughness of the surfaces being received and the illuminated frequency. Hence, to optimise the visibility of all objects in the image, the speckle noise needs to be reduced. Many different techniques have been proposed to combat speckle including using multiple frequencies and various filtering techniques as mentioned above, all having different advantages and disadvantages. According to the present invention, a new approach is proposed by which the disadvantages of the known techniques are overcome.

Figure 5:
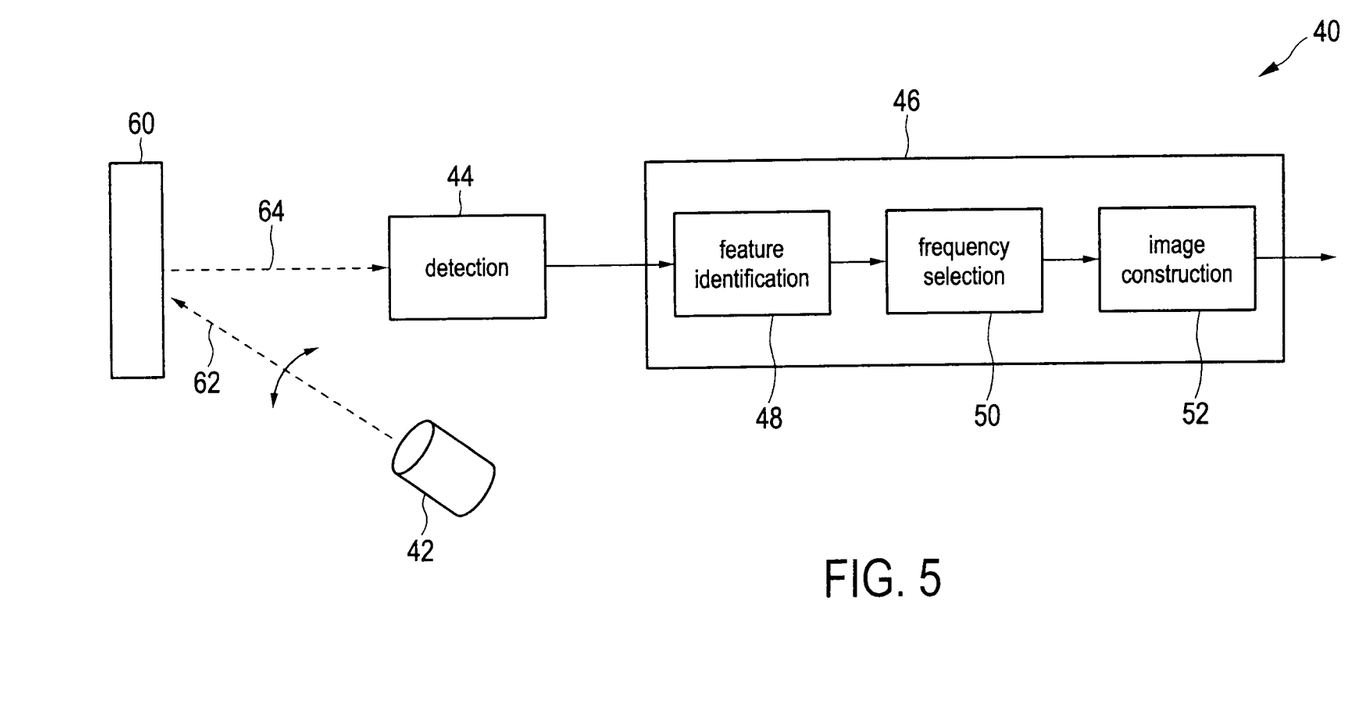
FIG. 5 shows a first embodiment of an active imaging device according to the present invention.

A first embodiment of an active imaging device 40 for imaging a scene 60, e.g. including an object, is schematically depicted in FIG. 5. The device 40 comprises an illumination means 42, e.g. a transmitter 12 including a transmit antenna 14 as shown in FIGS. 1 and 2, for illuminating said scene 60 with radiation 62 at multiple illumination frequencies or an illumination frequency range covering multiple illumination frequencies. A radiation detection means 44, e.g. a receiver 16 including a receive antenna 18 as shown in FIGS. 1 and 2, is provided for detecting radiation 64 received from said scene 60 in response to said illumination 62 and for generating detection data from said detected radiation 64. Said radiation data are then processed in an image processor 46.

Said processor 46 includes a feature identification means 48 for analysing said detection data and identifying different features in said scene 60, a frequency selection means 50 for separately selecting for the identified features one or more selected illumination frequencies resulting in the minimum speckle noise in an image of the respective feature constructed from the detection data, which have been generated from radiation 64 received in response to the illumination of the scene 60 with radiation 62 at said one or more selected illumination frequencies, and an image construction means 52 for constructing a final image from the detection data, wherein the image portions of the identified features are constructed from the detection data, which have been generated from radiation 64 received in response to the illumination of the scene with radiation 62 at said one or more selected illumination frequencies, and wherein said image portions are combined into the final image.

The elements 48, 50, 52 of said processor may be implemented in hardware and/or software. Their functions and effects will be explained below in more detail.

Figure 6:
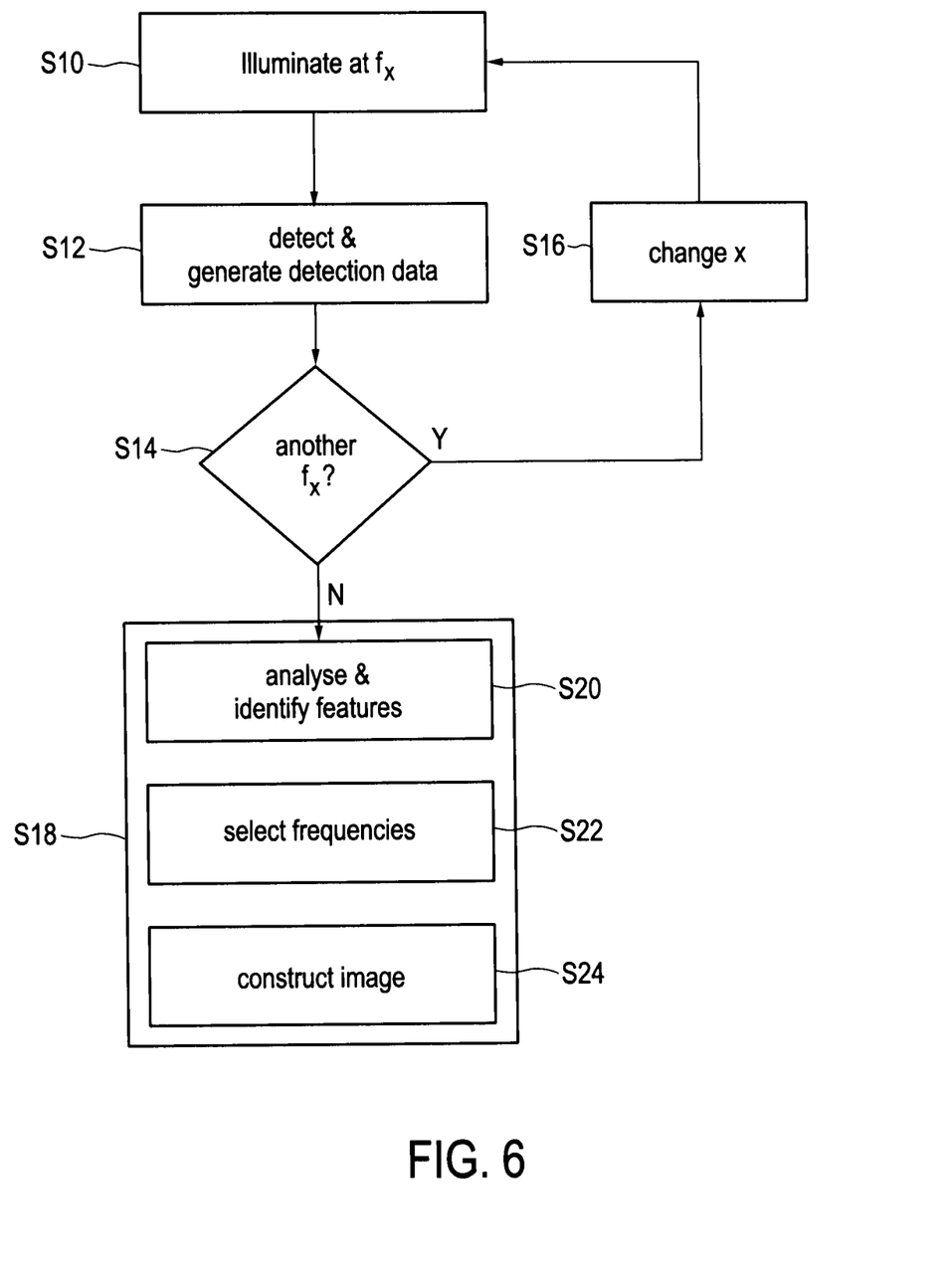
FIG. 6 shows a flow chart of a first embodiment of an active imaging method according to the present invention.

A flow chart of a first embodiment of the proposed imaging method is depicted in FIG. 6. In said embodiment it is assumed that the transmitter or illuminator 42 uses multiple frequencies to illuminate the scene 60 (or object or item) to be examined. The proposed method, however, can also be used with a wideband band illumination signal (typically generated by a short pulse), as will be explained below with reference to other embodiments.

In a first step S10 the scene is sequentially illuminated with radiation at multiple illumination frequencies $f_x$, which could for instance be in a range from kHz to hundreds of THz. After each illumination with a particular illumination frequency $f_x$, radiation received from said scene in response to said illumination is detected and detection data are generated from said detected radiation in step S12. These steps S10 and S12 are carried out sequentially, e.g. in a loop as shown in FIG. 6. Said loop includes the question in step S14 if there is another illumination frequency $f_x$ at which steps S10 and S12 shall be carried out, in which case x (e.g. starting at x=1 is increased by 1 in step S16, i.e. the next (generally predetermined) illumination frequency $f_x$ is used for carrying out S10 and S12 again.

After the scene has been illuminated at all desired illumination frequencies $f_x$ the obtained radiation data are subjected to image processing in step S18. Said image processing includes the step of analysing said detection data and identifying different features in said scene in step S20. Thereafter, in step S22, for the identified features one or more selected illumination frequencies resulting in the minimum speckle noise in an image of the respective feature constructed from the detection data, which have been generated from radiation received in response to the illumination of the scene with radiation at said one or more selected illumination frequencies, are separately selected in step S22. Finally, in step S24 a final image is constructed from the detection data, wherein the image portions of the identified features are constructed from the detection data, which have been generated from radiation received in response to the illumination of the scene with radiation at said one or more selected illumination frequencies, and wherein said image portions are combined into the final image.

Since the level of speckle depends upon the surface or layer roughness, the illuminated frequency and the angle of illumination, different parts or features of an object will have different levels of speckle at a given illumination frequency. Smooth parts or features of an object will have very low levels of speckle across a wide set of illumination frequencies, while rough parts of an object will have very high level of speckle when the roughness distribution has a mean value close to X/4, where X is the wavelength of the illumination frequency.

Depending upon the exact distribution of the roughness for each feature, using a higher or lower illumination frequency will have different effects. If, for instance, a certain feature has a roughness distribution where many component depths (see FIG. 4) have a value lower than the $\lambda_f/4$, where $\lambda_f$ is the wavelength of the present illumination frequency, then using a higher illumination frequency causes this feature to be viewed with more speckle noise.

If, on the other hand, a feature has a roughness distribution where many components depths have a value higher than the $\lambda_f/4$, where $\lambda_f$ is the wavelength of present illumination frequency, then using a higher illuminated frequency will enable the feature to be viewed with less speckle noise.

Figure 7A:
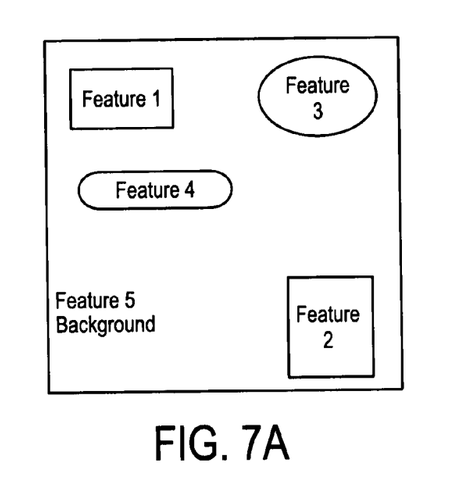
FIG. 7 shows a diagram illustrating feature selection according to the present invention.
Figure 7B:
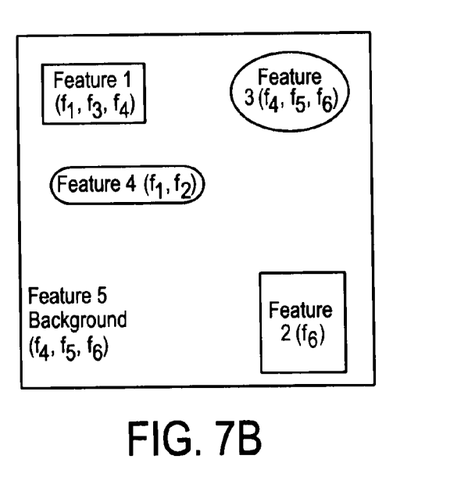

One idea of the present invention is therefore that to obtain a minimum level of speckle across a whole image, the best set of frequencies (from the total set of frequencies used for illumination) for selected (or each) feature(s) are found and these are then combined to represent that feature in the final image. This is schematically shown in FIG. 7, wherein FIG. 7A shows an example scene including 5 features and FIG. 7B shows the same scene, wherein for each feature the best set of frequencies has been selected from the original set of illumination frequencies $f_1$ to $f_6$. As can be seen, different features may have different best frequencies.

To achieve this, the following steps are used in the image processor 46 and the processing step S18, respectively.

Once the scene has been scanned, which may be achieved by moving the Tx and Rx beam antenna directions or by moving the transmitter and receiver units or by any other means, e.g. beam forming antennas or mirrors, the different features in the scene are identified in feature identification unit 48 and feature identification step S20, respectively. This feature identification may use in an embodiment individually a single illumination frequency, i.e. the detection data obtained for each separate illumination frequency are individually used for feature identification. In another embodiment his feature identification may combine the detection data (e.g. separate detection data sets) subsequently obtained for multiple illumination frequencies (e.g. may combine separate detection data sets, each detection data set being obtained for a different illumination frequency, e.g. by averaging or summing said detection data sets into a common detection data set for further processing). An example of a feature identification algorithm is generally described in the above cited paper of Zengguo et al., but there are many other possibilities. For instance, FIG. 5A shows a scene in which a number of different features have been identified.

Once the different features have been identified, in an embodiment the mean and/or variance of each feature are calculated for every illumination frequency for finding the best illumination frequencies for each feature in frequency selection unit 50 and frequency selection step S22, respectively. To choose the minimum amount of speckle noise, it is preferred in an embodiment to select frequencies which cause the minimum amount of variance (or standard deviation) across the feature, said condition being used as a frequency selection rule. Since the active imaging device may also have a non-flat frequency response across the range of illumination frequencies, the mean can also be measured and the best frequencies for each feature is then based on choosing the features which have the highest signal to noise ratio (mean of feature/variance of feature).

The final image is then constructed in the image construction unit 52 and the image construction step 24, respectively, by combining (e.g. summing or averaging) for selected or, preferably, each identified image feature the signals (receiver signals or image signals) from the set of best frequencies identified in the frequency selection step together. The final image therefore consists of all these optimally combined image features, resulting in an overall image with reduced speckle noise as shown in FIG. 5B.

Figure 8:
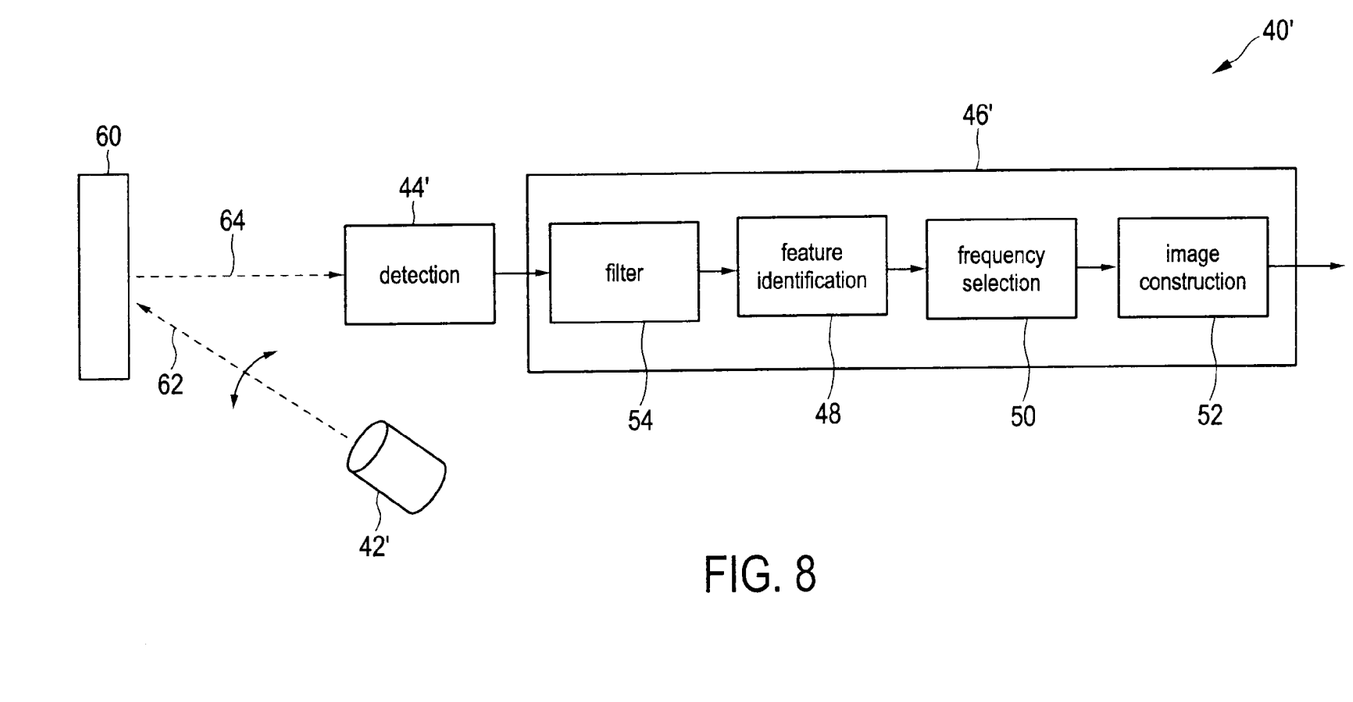
FIG. 8 shows a second embodiment of an active imaging device according to the present invention.
Figure 9:
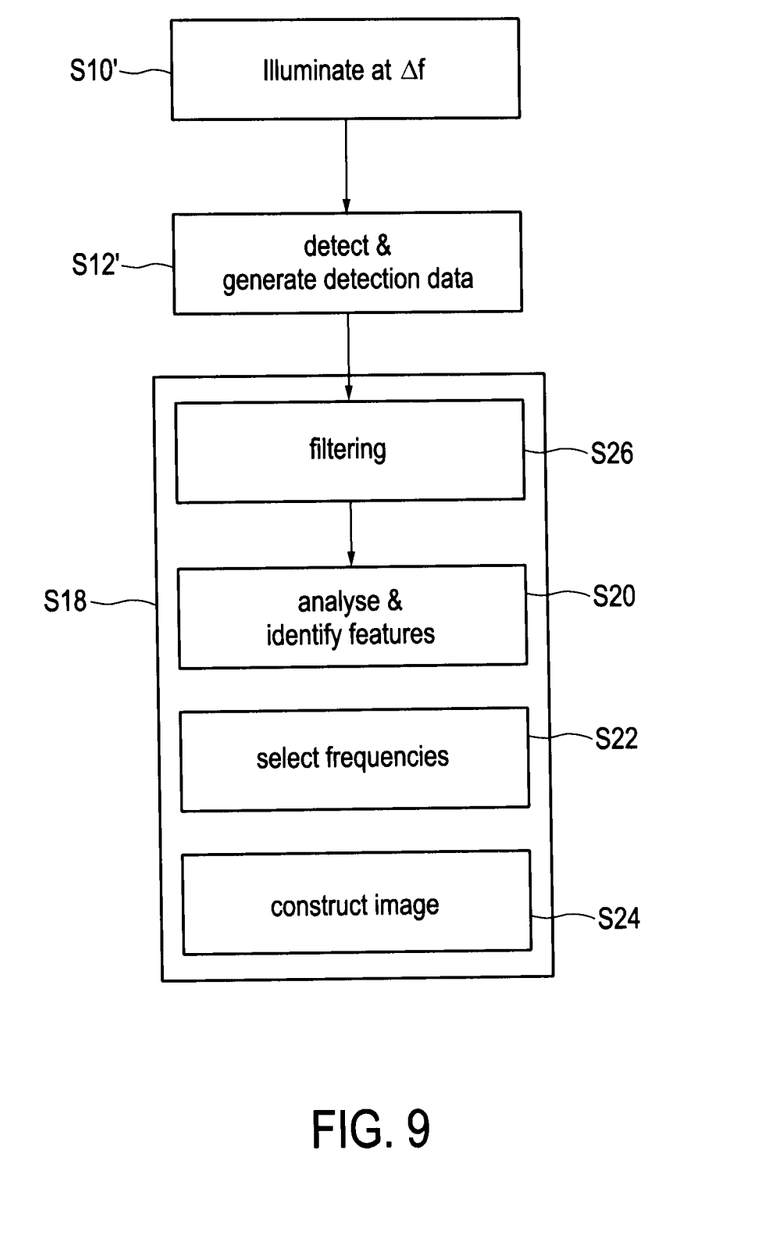
FIG. 9 shows a flow chart of a second embodiment of an active imaging method according to the present invention.

To simplify the explanation it has been assumed that the transmitter (or illuminator) is subsequently illuminating the object using multiple discrete frequencies. The proposed imaging method can, however, also be used when the transmitter is using a wideband illumination signal coving a frequency band Δf (i.e. not consisting of discrete frequencies), such as would be produced from a pulse based active imaging system, or when the transmitter is using a illumination signal simultaneously comprising a number of discrete frequencies or small frequency bands). A corresponding embodiment 40' of an active imaging device is depicted in FIG. 8, a corresponding embodiment of an active imaging method is depicted in FIG. 9. In this case the illuminator 42' illumination the scene 60 with the wideband illumination signal (step 510'), and the detector 44' receives a single detection data set (step S12').

In this case the processor 46' would need to examine different frequency components of the received detection data obtained from the reflected wideband illumination signal. These different frequency components would typically be obtained using a filter 54 (step S26), e.g. an FFT unit, but other methods are also possible. The other units of the processor 46' and the other steps of the processing step S18 are generally identical to the units and steps explained above for the first embodiment. In particular, in this case the method and device described above are also applicable be replacing the concept of different illumination frequencies with the frequency components identified at the receiver.

In summary, the proposed method and device select the best combination of receiver frequencies to reduce speckle (from the set of illuminated frequencies) for selected or each image feature. The final image therefore comprises these optimally combined image features, resulting in an overall image with reduced speckle noise.

Compared to a system which uses multiple frequencies but uses no intelligence to optimally combine these frequencies, the proposed idea results in an image with reduced speckle noise.

Compared to a system as described in the above cited paper of Jaeger et al., in which the optical properties of the object are measured to dynamically change the spacing between the illuminated frequencies, various advantages are obtained. In particular, the proposed method requires the transmitter to dynamically change its set of transmitter frequencies. Further, no feedback information is required from the receive and it is not require that the object is optically (or otherwise) visible, so that, the physical properties can be measured.

The invention can be applied in a wide range of applications and technical fields, in particular all areas where active imaging of a scene is used and where speckle noise generally is a problem. These fields particularly include the fields of medical imaging, e.g. by use of ultrasound, active radiometry or security scanning. The applicable frequencies may be selected from a wide range, particularly dependent on the kind of application. Said wide frequency range ranges generally from 20 kHz up to hundreds of THz. Preferred frequency ranges are in the millimeter wavelength range.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Active imaging device for imaging a scene, comprising:
   a scene illuminator that illuminates said scene with radiation at multiple illumination frequencies or an illumination frequency range covering multiple illumination frequencies,
   a radiation detector that detects radiation received from said scene in response to said illumination and that generates detection data from said detected radiation,
   a feature identifier that analyses said detection data and identifies different features in said scene,
   a frequency selector that separately selects for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
   an image constructor that constructs a final image from the detection data, wherein the image portions of the identified features are constructed from the detection data, which have been generated from radiation received in response to the illumination of the scene with radiation at said one or more selected illumination frequencies, and wherein said image portions are combined into the final image.

2. Active imaging device as claimed in claim 1, wherein said frequency selector is adapted for separately selecting said one or more selected illumination frequencies for each individual identified feature.

3. Active imaging device as claimed in claim 1, wherein said frequency selector is adapted for separately selecting said one or more selected illumination frequencies based on a predetermined frequency selection rule.

4. Active imaging device as claimed in claim 1, wherein said frequency selector is adapted for determining the variance and/or standard deviation of the identified features at said individual illumination frequencies and for selecting one or more illumination frequencies as selected illumination frequencies resulting in the lowest variance and/or lowest standard deviation.

5. Active imaging device as claimed in claim 1, wherein said frequency selector is adapted for determining the mean and/or signal-to-noise ratio of the identified features at said individual illumination frequencies and for selecting one or more illumination frequencies as selected illumination frequencies resulting in the highest mean and/or highest signal-to-noise ratio.

6. Active imaging device as claimed in claim 1, wherein said illuminator is adapted for sequentially illuminating said scene with radiation at different illumination frequencies, and
said radiation detector, said feature identifier and said frequency selector are adapted for, individually for said illuminations at said different illumination frequencies, detecting radiation, generating detection data sets, analyzing said detection data sets, identifying different features and selecting said one or more selected illumination frequencies.

7. Active imaging device as claimed in claim 1, wherein said illuminator is adapted for sequentially illuminating said scene with radiation at different illumination frequencies,
said radiation detector is adapted for, individually for said illuminations at said different illumination frequencies, detecting radiation and generating detection data sets,
said feature identifier is adapted for combining and/or averaging said detection data sets into a common detection data set and for analyzing said common detection data set and identifying different features in said scene.

8. Active imaging device as claimed in claim 1, wherein said illuminator is adapted for simultaneously illuminating said scene with radiation at different illumination frequencies or an illumination frequency range covering multiple different illumination frequencies, and
a filter is provided that derives frequency-selective detection data sets from the detection data detected by said radiation detector, and
said feature identifier and said frequency selector are adapted for, individually for said frequency-selective detection data sets, analyzing said detection data sets, identifying different features and selecting said one or more selected illumination frequencies.

9. Active imaging device as claimed in claim 1, wherein said image constructor is adapted for constructing the final image by summing up or averaging the image portions of the identified features after they have been selected by the frequency selector.

10. Active imaging device as claimed in claim 1, wherein the device is an ultrasound device, a security scanner or an active radiometric imaging device.

11. Active imaging method for imaging a scene, comprising the steps of:
- illuminating said scene with radiation at multiple illumination frequencies or an illumination frequency range covering multiple illumination frequencies,
- detecting radiation received from said scene in response to said illumination,
- generating detection data from said detected radiation,
- analyzing said detection data and identifying different features in said scene,
- separately selecting for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
- constructing a final image from the detection data, wherein the image portions of the identified features are constructed from the detection data, which have been generated from radiation received in response to the illumination of the scene with radiation at said one or more selected illumination frequencies, and wherein said image portions are combined into the final image.

12. An image processor for use in an active imaging device for imaging a scene and comprising a scene illuminator that illuminates said scene with radiation at multiple illumination frequencies or an illumination frequency range covering multiple illumination frequencies, and a radiation detector that detects radiation received from said scene in response to said illumination and that generates detection data from said detected radiation, said image processor comprising:
- a feature identifier that analyses said detection data and identifies different features in said scene,
- a frequency selector that separately selects for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
- an image constructor that constructs a final image from the detection data, wherein the image portions of the identified features are constructed from the detection data, which have been generated from radiation received in response to the illumination of the scene with radiation at said one or more selected illumination frequencies, and wherein said image portions are combined into the final image.

13. An image processing method for use in an active imaging device as claimed in claim 12 for imaging a scene and comprising the steps of illuminating said scene with radiation at multiple illumination frequencies or an illumination frequency range covering multiple illumination frequencies, detecting radiation received from said scene in response to said illumination, and generating detection data from said detected radiation, said image processing method comprising the steps of:
- analyzing with an image processor said detection data and identifying different features in said scene,
- separately selecting for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
- constructing with the image processor a final image from the detection data, wherein the image portions of the identified features are constructed from the detection data, which have been generated from radiation received in response to the illumination of the scene with radiation at said one or more selected illumination frequencies, and wherein said image portions are combined into the final image.

14. Computer readable non-transitory medium having instructions stored thereon which, when carried out on a computer, cause the computer to perform the steps of the method as claimed in claim 13.

15. Active imaging device for imaging a scene, comprising:
- an illumination means for illuminating said scene with radiation at multiple illumination frequencies or an illumination frequency range covering multiple illumination frequencies,
- a radiation detection means for detecting radiation received from said scene in response to said illumination and for generating detection data from said detected radiation,
- a feature identification means for analyzing said detection data and identifying different features in said scene,
- a frequency selection means for separately selecting for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
- an image construction means for constructing a final image from the detection data, wherein the image portions of the identified features are constructed from the detection data, which have been generated from radiation received in response to the illumination of the scene with radiation at said one or more selected illumination frequencies, and wherein said image portions are combined into the final image.

16. An image processing device for use in an active imaging device for imaging a scene and comprising an illumination means for illuminating said scene with radiation at multiple illumination frequencies or an illumination frequency range covering multiple illumination frequencies and a radiation detection means for detecting radiation received from said scene in response to said illumination and for generating detection data from said detected radiation, said image processing device comprising:
- a feature identification means for analyzing said detection data and identifying different features in said scene,
- a frequency selection means for separately selecting for the identified features one or more selected illumination frequencies resulting in the minimum speckle noise in an image of the respective feature constructed from the detection data, which have been generated from radiation received in response to the illumination of the scene with radiation at said one or more selected illumination frequencies, and
- an image construction means for constructing a final image from the detection data, wherein the image portions of the identified features are constructed from the detection data, which have been generated from radiation received in response to the illumination of the scene with radiation at said one or more selected illumination frequencies, and wherein said image portions are combined into the final image.

* * * * *